July 27, 1965 A. M. BRENNEKE 3,197,243
ALIGNING AND LOCKING DEVICE
Filed Aug. 15, 1961
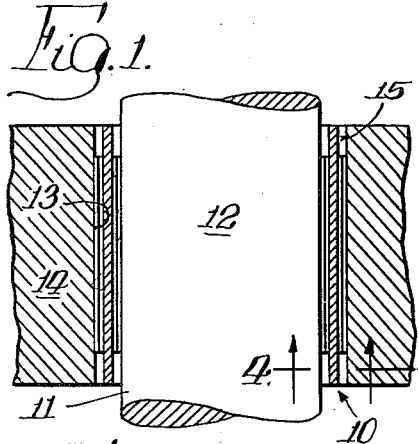
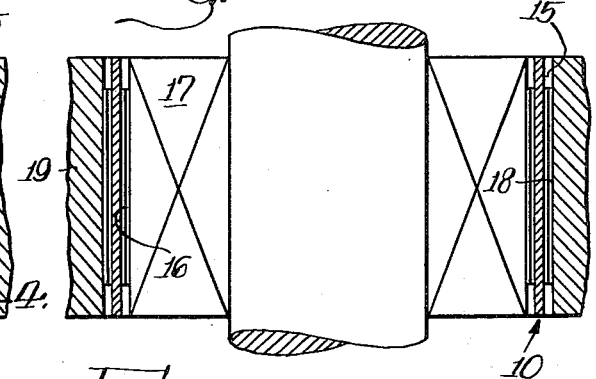
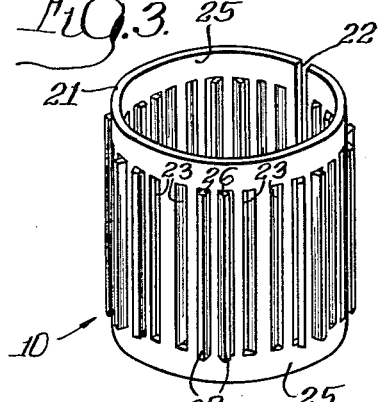
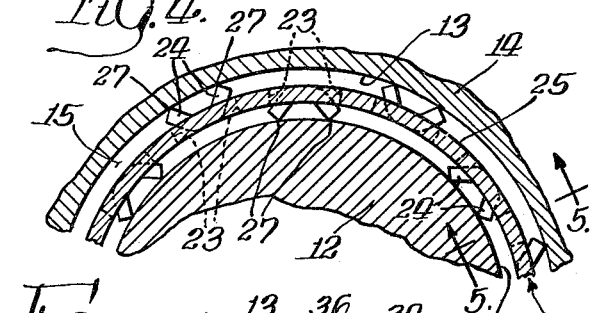
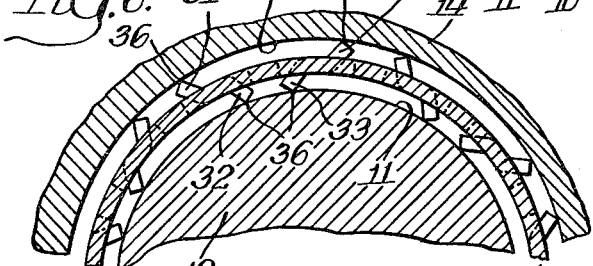
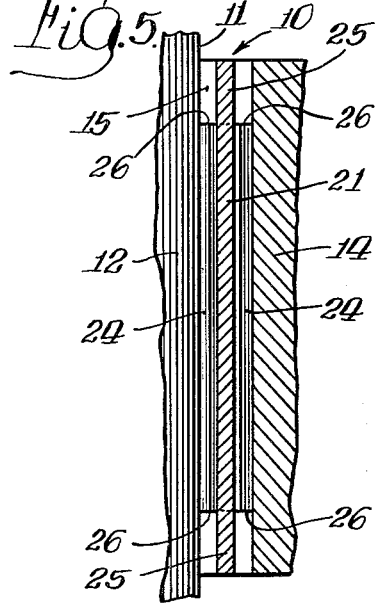
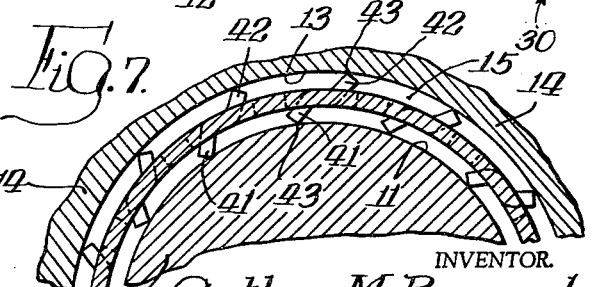
INVENTOR.
Arthur M. Brenneke,
BY
Davis, Lindsey, Libben & Noyes
Atty's.

3,197,243
Patented July 27, 1965

1

3,197,243
ALIGNING AND LOCKING DEVICE
Arthur M. Brenneke, Hagerstown, Ind., assignor, by mesne assignments, to Perfect Circle Corporation, Hagerstown, Ind., a corporation of Indiana
Filed Aug. 15, 1961, Ser. No. 131,654
3 Claims. (Cl. 287—52)

This invention relates generally to aligning and locking devices, and more particularly relates to a combination aligning and locking device for maintaining a pair of members centered with each other and for preventing relative rotation therebetween.

Various devices have been provided heretofore for maintaining a pair of member centered with each other and for preventing relative rotation therebetween where one member is fitted within the other member. Examples of such arrangement are a shaft and pulley or a shaft supporting bearing and a bearing supporting retaining wall. While such devices have proved more or less satisfactory to some extent, they have not proved satisfactory in resisting large torsional loads acting between the members with which they were used.

The combination aligning and locking device of the present invention overcomes the foregoing disadvantages in that it not only maintains the pair of members centered with each other but also provides a positive or driving interconnection between the members so as to prevent relative rotation therebetween when the members are subject to torsional loads. Moreover, the type of construction employed in the present device permits the use of simplified manufacturing techniques using conventional metal-forming machinery.

Accordingly, it is a general object of the present invention to provide a novel combination aligning and locking device adapted to maintain a pair of members centered with each other and to resist relative rotation therebetween.

Another object is to provide a novel combination aligning and locking device of the foregoing character which may be used in conjunction with members varying somewhat in size from a given size.

A further object is to provide a novel combination aligning and locking device of the foregoing character that is simple in construction, economical to manufacture, and reliable in operation.

These and other objects will become apparent from the following description and accompanying sheet of drawings in which:

FIGURE 1 is a semi-diagrammatic fragmentary sectional view, with some parts in elevation, of a combination aligning and locking device embodying the features of the present invention and showing one application of the device, in this instance between a shaft and the hub of a pulley;

FIG. 2 is a view similar to FIG. 1 illustrating another application of the present device, in this instance between a shaft supporting bearing and the supporting wall of a housing;

FIG. 3 is a perspective view of the preferred form of construction of an aligning and locking device embodying the features of the present invention as the latter would appear prior to use;

FIG. 4 is a fragmentary sectional view along the line 4—4 of FIG. 1;

FIG. 5 is an enlarged sectional view along the line 5—5 of FIG. 4;

FIG. 6 is a view similar to FIG. 4, and showing another construction of the combination aligning and locking device; and FIG. 7 is a view similar to FIGS. 4 and 6, and showing still another construction of the aligning and locking device.

Briefly described, the present invention broadly contemplates a combination aligning and locking device for maintaining a pair of members centered with each other and for preventing relative rotation therebetween, with one member mounted within the other. To this end, the aligning and locking device comprises a strip of material bent into annular form and having axially extending portions thereof bent inwardly and outwardly of the annulus to provide axially extending projections. The projections have sharp, axially extending, edges adapted to engage adjacent surfaces of a pair of members having a clearance therebetween when the device is inserted in such clearance to maintain the members centered with each other. The sharp edges of the projections are adapted to bite into the adjacent surfaces of the members upon installation of the device, thereby preventing relative rotation between the members. The radial distance between the edges of the inwardly and outwardly extending projections initially is greater than the clearance between the members, and consequently, the projections will yield on installation of the device, thereby forcing the edges of the projections against the surfaces of the members between which the device is installed to thus maintain the members centered with each other. Moreover, the device functions fully even with members having some variation in clearance.

In the several embodiments of the invention to be hereinafter described, it will be noted that each differs from the others in the manner in which the material of the strip is bent to provide the outwardly extending projections. With the exception of one form of the aligning and locking device to be hereinafter described, relative torsional movement between an associated pair of members is resisted in both directions. All embodiments of the invention are effective to maintain the members centered with each other.

In FIGS. 1 and 2, two specific applications of or uses for the combined aligning and locking device are illustrated. Thus, in FIG. 1, a combination aligning and locking device 10, embodying the features of the present invention, is shown in operative relation between the annular outer surface 11 of a shaft 12, and the adjacent inner annular surface 13 of the hub 14 of a pulley or the like. The diameter of the shaft 12 is somewhat less than the diameter of the opening or hub 14 of the pulley, thereby providing an annular clearance 15 therebetween when the shaft 12 is inserted into the pulley hub 14. Installation of the device 10 between the adjacent annular surfaces 11 and 13 of the shaft 12 and hub 14, respectively, not only serves to center the shaft within the hub, but also serves to prevent relative rotation between the shaft and pulley when these members are subjected to relative torsional loads.

In FIG. 2, the device 10 is illustrated in operative relation between the outer surface, indicated at 16, of a bearing 17 which supports a shaft or the like, and the adjacent inner annular surface, indicated at 18, of an opening or hole in a wall 19, of a housing. Thus, in FIG. 2, the locking device 10 serves a combined aligning and locking function with respect to the bearing 17 and opening in the housing wall 19 in the same manner as with the shaft 12 and pulley hub 14. It will be understood that, while the combination aligning and locking device hereinafter described is illustrated as used between a shaft and a hub and between a bearing and a supporting wall, it may be used in any other application where it is desired to maintain a pair of members centered with each other and where relative rotation between the members in at least one direction is to be resisted.

In FIGS. 3, 4 and 5, there is illustrated the preferred form of construction of the combination aligning and locking device 10. The device 10, in this instance, comprises a member 21, formed from a strip of resilient sheet material such as spring steel or the like, and subsequently bent into an annulus having a gap 22 between the ends thereof. The length of the strip of material, of course, determines the diameter of the ring and may be varied to provide the desired size. The thickness of the strip of material is less than the clearance between the two members to be aligned and locked together.

In order to center one member within the other and to lock them against relative rotation when the device is inserted in the clearance between the member, the device 10 is provided with projections extending both inwardly and outwardly of the annulus to engage the respective members. To this end, the material is initially slit or cut, preferably when in a flat condition, to provide a series of spaced pairs of slits 23 which define partially severed portions 24 of the material of the strip therebetween. The portions 24 thus extend transversely of the length of the strip and parallel to the axis thereof when the strip is formed into an annulus. Each slit 23 includes a circumferentially extending portion 26, at the ends thereof, the portions 26 of each pair of slits 23 extending circumferentially toward each other so that the slits are U-shaped and open toward each other. The end portions 26 of the slits 23 are spaced inwardly from the ends of the annulus to provide band portions 25 at the respective ends. After the slits 23 have been formed in the strip of material, the portions 24 are bent outwardly from the plane of the strip and on each side thereof, that is, inwardly and outwardly of the annulus to define relatively sharp, free edges 27 extending axially of the annulus.

In the embodiment shown in FIGS. 3, 4 and 5, the projections 24 of each pair are bent in the same direction radially and the pairs of projections 24 are bent alternately inwardly and outwardly of the annulus. Also, the projections of each pair are inclined away from the other at the same angle with respect to the main body of the annulus. The radial distance between the edges 27 of the inwardly and outwardly extending projections is greater than the clearance between the members.

Thus, when the ring 21 is inserted in the clearance 15 between the shaft 12 and hub of the pulley 14, for example, the projections 24 will yield inwardly, and the outer edges 27 of the projections will tightly engage the surfaces 11 and 13. The two members 12 and 14 will thus be centered with each other. On torsional loads between the two members, the edges 27 will bite into the surfaces of the members and provide a spline-like interconnection therebetween. Since the end portions 26 of the slits 23 extend circumferentially, the entire edge 27 of each projection engages the surface of one member and relatively large torsional loads may thus be transmitted from one member to the other. The projections 24 are also adequately supported at their ends by the band portions 25. Because the projections 24 of each pair are inclined oppositely to each other, the edges 27 of each pair of projections will prevent relative rotation between the surfaces 11 and 13 in opposite directions. Thus, when the combination aligning and locking device 10 is installed between a pair of members in the manner illustrated in FIG. 4, either member may be used to drive the other in either direction and relative torsional movement or slippage therebetween is prevented. Since the projections 24 are caused to yield inwardly when inserted between the two members, small variations in the diameters of the member do not affect the ability of the device to function properly.

It will be understood that the thickness of the material of the ring 21, the length of the slits 23 including the inturned end portions 26, the circumferential spacing therebetween, and the extent to which the projections 24 are bent outwardly may be varied in accordance with a particular installation.

In FIG. 6, another form of combination aligning and locking device is illustrated at 30. The aligning and locking device 30 is similar to the device 10 to the extent that it comprises an annulus formed from a strip of resilient material in the manner of the device 10. The embodiment 30 differs from the previous embodiment in the manner in which the partially severed portions enclosed by the slits 23 are bent to provide the outwardly extending projections. Thus, as will be apparent from FIG. 6, one of the portions, such as a portion 31, defined by one of each pair of slits 23, is bent outwardly of the annulus, and the other portion formed by the other of the pair of slits 23, such as a portion 32, is bent inwardly of the annulus. The next adjacent pair of portions, such as the portions 33 and 34 as illustrated in FIG. 6, are similarly but alternately bent inwardly and outwardly of the annulus so that adjacent portions 32 and 33 of two pairs are on the same side of the annulus but extend circumferentially in opposite directions. Each of the portions or projections 31, 32, 33 and 34 are inclined at the same but opposite angle.

The axially extending outer edges, indicated at 36, of the projections 31, 32, 33 and 34 are inclined with respect to the adjacent surfaces 11 and 13, of an associated pair of members, such as the shaft 12 and pulley hub 14, to provide a centering and spline-like interconnection between the members. Because adjacent projections of adjacent pairs, such as the projections 32 and 33, extend circumferentially in opposite directions and are disposed on the same side of the annulus, the aligning and locking device 30 will prevent relative rotational movement between the pair of members in both directions. The device 30 is installed in the same manner as the previous embodiment.

In FIG. 7 another form of aligning and locking device construction is illustrated and indicated generally at 40. The device 40 is similar to the previous embodiments insofar as the manner in which the strip of material 21 is slit prior to the formation of the outwardly extending projections. The embodiment 40 differs from the previous embodiments in the manner in which the portions are bent to form the projections. As will be apparent from FIG. 7, portions 41 and 42 of partially severed material, defined by a pair of adjacent slits 23, are bent so that the portions 41 and 42 alternately extend inwardly and outwardly of the annulus and are inclined in the same direction. The outer edges, indicated at 43, of the projections 41 and 42 are thus inclined with respect to the adjacent surfaces, such as the surfaces 11 and 13, when the device is inserted into the annular clearance 15 therebetween. The edges 43 will thus hold the surfaces 11 and 13 centered with each other. Because the projections 41 and 42 are all inclined in the same direction, the device 40 will only prevent relative rotation of the members in one direction in addition to its aligning function. For this same reason, the resistance to relative movement between the members 12 and 14 in the direction in which movement is resisted, namely, clockwise movement of the shaft 12 and counterclockwise movement of the pulley 14, as viewed in FIG. 7, will be greater than the previous embodiments because all projections 41 and 42 function to resist such movement, whereas in the previous embodiments only half of the projections resist rotation in one direction. The embodiment 40 is thus adapted for use where only one direction of relative rotation between a pair of members is to be prevented.

I claim:

1. A combination aligning and locking device for maintaining a pair of members having a clearance therebetween centered with each other and for interconnecting the members to prevent relative rotation therebetween, comprising a strip of resilient sheet material having a thickness less than the clearance between said members and bent to form an annulus adapted to be mounted in said clearance, and said annulus having projections extending inwardly and outwardly therefrom and defining relatively sharp, free edges spaced from said annulus, the radial distance between said edges of said inwardly and outwardly extending projections being greater than the clearance between said members, whereby the edges of said projections engage the adjacent surfaces of said members when said device is inserted therebetween, said device thereby being effective to maintain said members centered with each other and to prevent relative rotation therebetween, said projections being elongated axially of the annulus to provide elongated edges engaging said members, said inwardly extending projections also extending circumferentially alternately in opposite directions and the outwardly extending projections also extending circumferentially alternately in opposite directions.

2. A combination aligning and locking device for maintaining a pair of members having a clearance therebetween centered with each other and for interconnecting the members to prevent relative rotation therebetween, comprising a strip of resilient sheet material having a thickness less than the clearance between said members and bent to form an annulus adapted to be mounted in said clearance, and said annulus having projections extending inwardly and outwardly therefrom and defining relatively sharp, free edges spaced from said annulus, the radial distance between said edges of said inwardly and outwardly extending projections being greater than the clearance between said members, whereby the edges of said projections engage the adjacent surfaces of said members when said device is inserted therebetween, said device thereby being effective to maintain said members centered with each other and to prevent relative rotation therebetween, said projections being elongated axially of the annulus to provide elongated edges engaging said members, said projections being arranged in pairs and one projection of each pair extending outwardly from said annulus and the other projection of each pair extending inwardly from said annulus, said inwardly extending projections of adjacent pairs being inclined toward each other to resist relative torsional movement of said members in either direction.

3. A combination aligning and locking device for maintaining a pair of members having a clearance therebetween centered with each other and for interconnecting the members to prevent relative rotation therebetween, comprising a strip of resilient sheet material having a thickness less than the clearance between said members and bent to form an annulus adapted to be mounted in said clearance, and said annulus having projections extending inwardly and outwardly therefrom and defining relatively sharp, free edges spaced from said annulus, the radial distance between said edges of said inwardly and outwardly extending projections being greater than the clearance between said members, whereby the edges of said projections engage the adjacent surfaces of said members when said device is inserted therebetween, said device thereby being effective to maintain said members centered with each other and to prevent relative rotation therebetween, said projections being elongated axially of the annulus to provide elongated edges engaging said member, said projections comprising partially severed portions of the material of said strip bent therefrom, said partially severed portions being formed by a plurality of axially extending slits in said annulus, the ends of said slits including portions extending circumferentially of said annulus so that the entire edge of each projection engages one of said members, said circumferentially extending end portions of said slits being spaced inwardly from the ends of said annulus to provide band portions at both ends of said annulus tying said projections together.

References Cited by the Examiner

UNITED STATES PATENTS

| | | | |
|---|---|---|---|
| 1,323,188 | 11/19 | Humphris | 151—41.73 X |
| 2,164,109 | 6/39 | Guiducci | 151—41 |
| 2,206,373 | 7/40 | Stieber | 287—52 X |
| 2,628,113 | 2/53 | Jones | 287—52 X |
| 2,657,082 | 10/53 | Blackman | 287—52.04 |
| 2,670,227 | 2/54 | Green. | |
| 2,886,354 | 5/59 | Bjorklund | 287—52 |
| 2,931,412 | 4/60 | Wing | 287—52 |

CARL W. TOMLIN, *Primary Examiner.*

WALTER A. SCHEEL, *Examiner.*